United States Patent [19]

Erickson

[11] 4,398,853
[45] Aug. 16, 1983

[54] INSERT HOLDER AND METHOD OF HOLDING

[75] Inventor: Robert A. Erickson, Latrobe, Pa.

[73] Assignee: Kennametal Inc., Latrobe, Pa.

[21] Appl. No.: 214,233

[22] Filed: Dec. 8, 1980

Related U.S. Application Data

[63] Continuation-in-part of Ser. No. 205,440, Nov. 10, 1980.

[51] Int. Cl.³ .............................................. B23B 29/04
[52] U.S. Cl. .................................................... 407/104
[58] Field of Search ................ 407/104, 105, 103, 91, 407/50, 109, 106, 107, 48

[56] References Cited

U.S. PATENT DOCUMENTS

| | | | |
|---|---|---|---|
| 2,519,938 | 8/1950 | Sitton | 407/107 |
| 3,192,603 | 7/1965 | Greenleaf | 407/103 |
| 3,546,758 | 12/1970 | Stier | 407/104 |

FOREIGN PATENT DOCUMENTS

| | | | |
|---|---|---|---|
| 2226188 | 2/1973 | Fed. Rep. of Germany | 407/105 |
| 2720249 | 11/1978 | Fed. Rep. of Germany | 407/109 |
| 517406 | 7/1976 | U.S.S.R. | 407/105 |
| 543465 | 4/1977 | U.S.S.R. | 407/105 |
| 561626 | 7/1977 | U.S.S.R. | 407/104 |
| 665993 | 6/1979 | U.S.S.R. | 407/105 |

*Primary Examiner*—Leonidas Vlachos
*Assistant Examiner*—Jerry Kearns
*Attorney, Agent, or Firm*—Lawrence R. Burns; Ira D. Blecker

[57] ABSTRACT

A toolholder for releasably holding an indexable cutting insert is described. The insert is locked onto an insert receiving pocket on the toolholder by a locking pin whose head clamps against an upwardly facing wall in a tapered central aperture through the insert. The pin is threadably engaged to the toolholder and is configured so as to allow itself to tilt outwardly, after the insert is unclamped, allowing the insert to be removed from the pin and the insert pocket.

7 Claims, 11 Drawing Figures

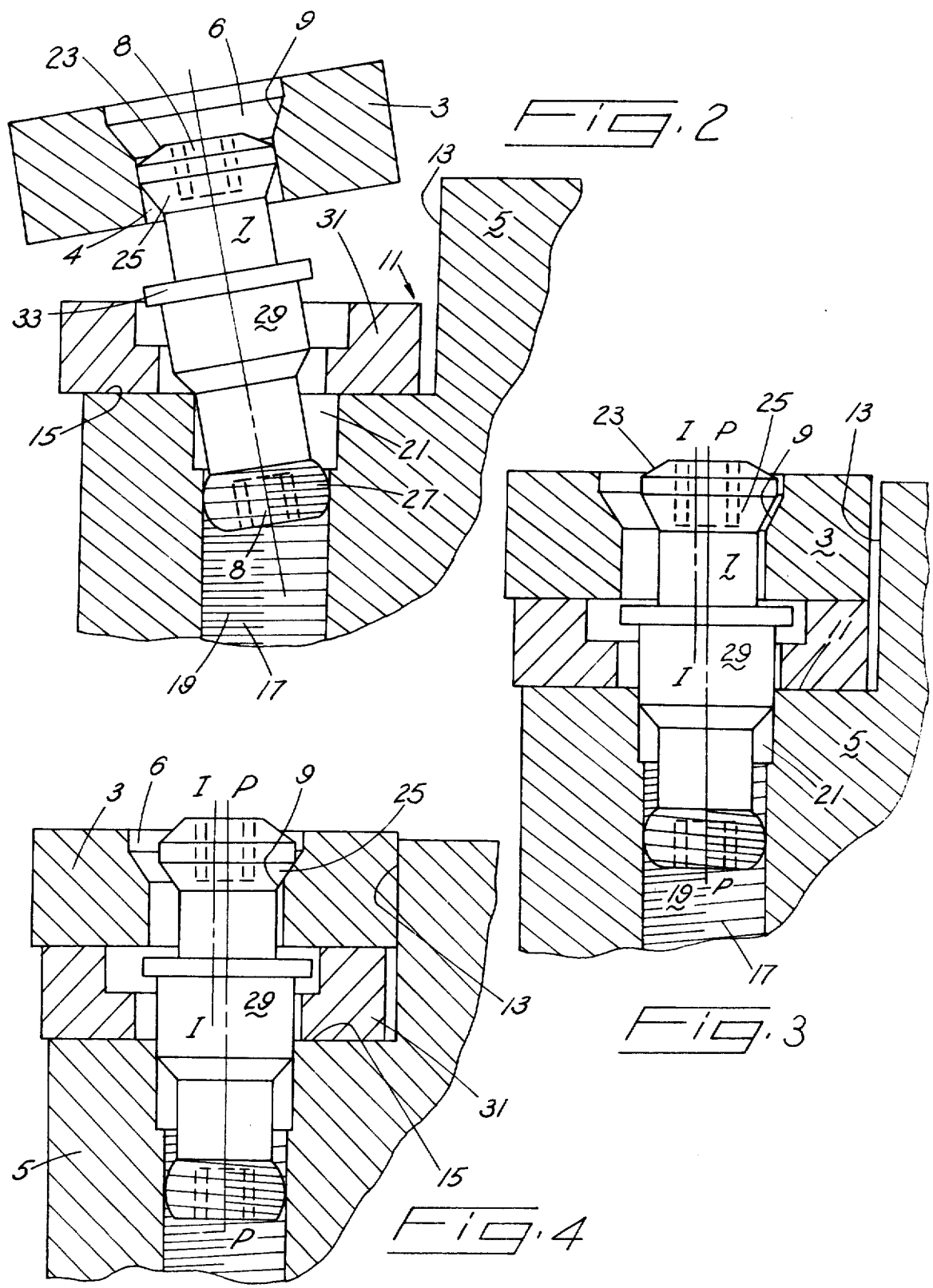

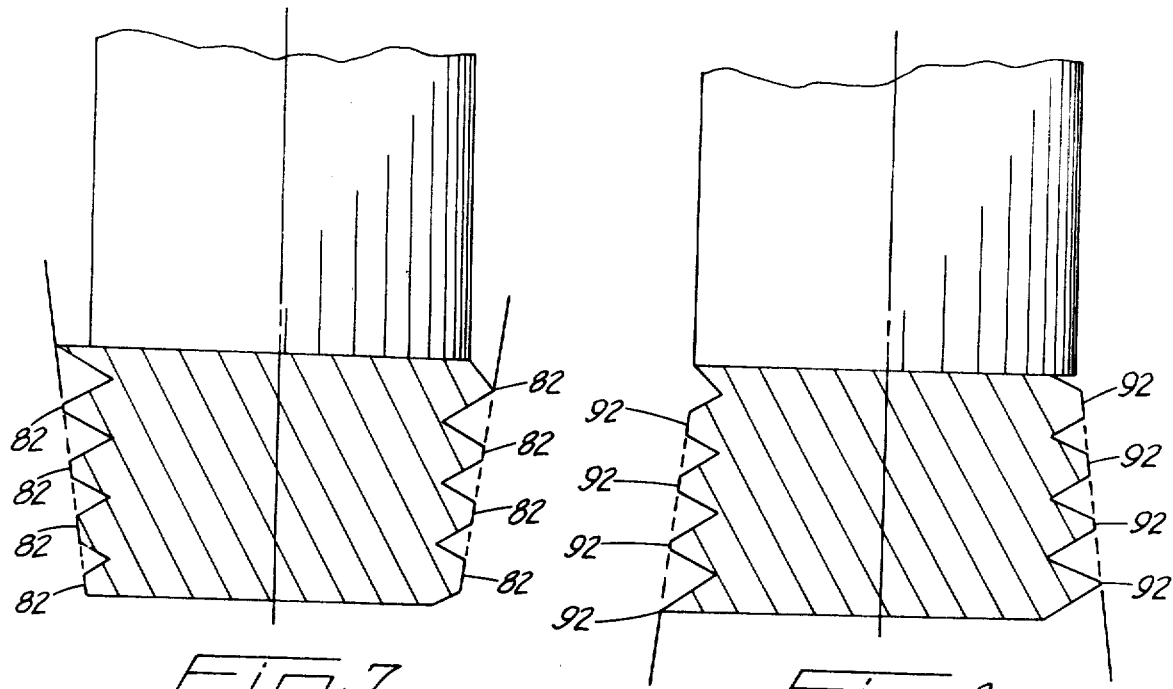
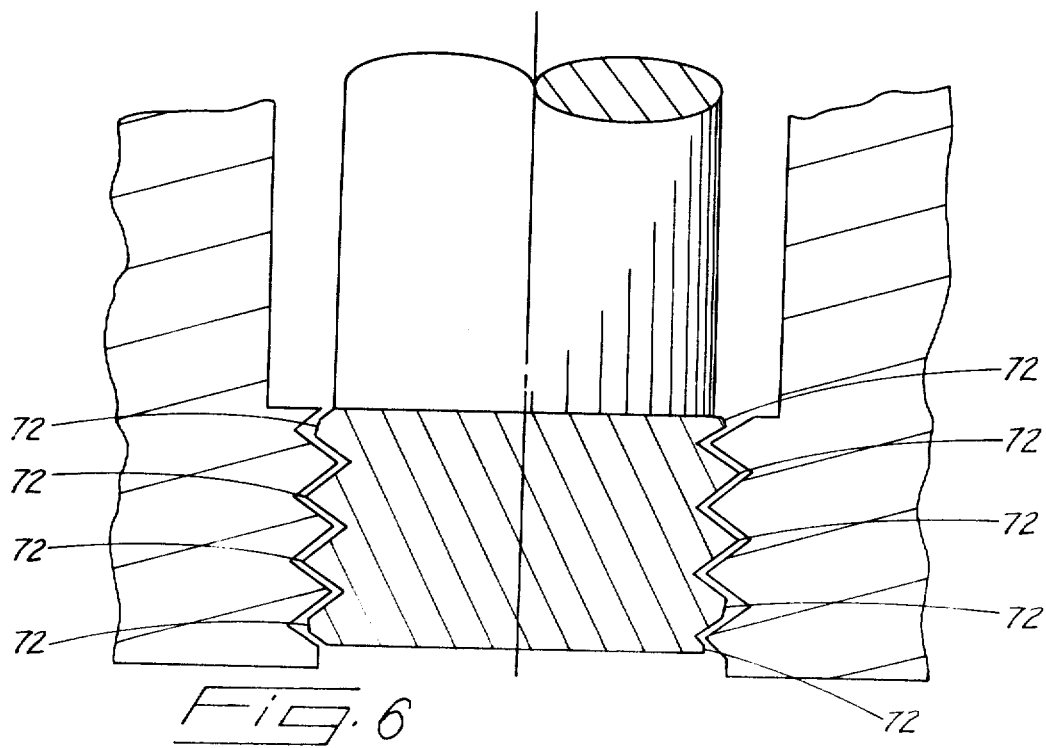

INSERT HOLDER AND METHOD OF HOLDING

RELATED APPLICATION

The present application is a continuation-in-part of copending application Ser. No. 205,440, filed Nov. 10, 1980.

BACKGROUND OF THE INVENTION

This invention pertains to toolholders for holding cutting inserts used in the metalworking field. It especially pertains to toolholders utilizing tiltable locking pins and methods of locking indexable cutting inserts onto toolholders.

Previous insert clamping mechanisms, as exemplified by U.S. Pat. Nos. 3,341,920 and 3,341,921, utilize a conical bore whose axis is offset from the threaded section of the locking pin receiving hole to tilt the locking pin into abutment with the cutting insert. These designs are difficult to machine since the location of the conical bore must be maintained within relatively tight tolerances if it is to achieve the desired tilting of the locking pin.

Other toolholder designs utilizing tilting or laterally moving locking pins are described in U.S. Pat. Nos. 3,533,150; 3,654,682; 3,662,444; 3,623,201; and 3,747,179.

BRIEF SUMMARY OF THE INVENTION

According to the present invention, a toolholder for use in holding a cutting insert is provided. This toolholder has a body portion with an insert receiving pocket on it. The pocket has a planar bottom wall, at least one side wall extending upwardly from the bottom wall, and a pin receiving hole formed downwardly through, and substantially normal to, the bottom wall. The pin receiving hole has a threaded section and a smooth bore section.

In accordance with the present invention, a locking pin is also provided. This locking pin has a head for clamping against a cutting insert, a threaded portion for engagement with the threaded section in the pin receiving hole, and an increased cross section bearing means, or increased diameter section, for snugly and slidingly engaging the smooth bore of the pin receiving hole.

The pin clamping head comprises a first and second diameter with the first diameter being smaller than the second diameter. A downwardly facing or locking shoulder is formed between the first and second diameters. This clamping head is designed for use with a cutting insert having a tapered aperture with a wall or locking face of said aperture facing upwardly.

According to one embodiment of the present invention, the threaded portion of the pin has reduced pitch diameter threads so as to allow the pin to tilt while still being threadedly engaged in the pin receiving hole. In this embodiment, the increased cross section portion of the pin is located between the clamping head and threaded portion. When the locking pin according to this embodiment is rotated to a first position, the threaded portion of the pin and the hole are at least partially engaged with one another and the pin is tiltable so as to allow the locking pin clamping head to be inserted into the insert aperture.

When the locking pin is rotated to a second position, the increased diameter section of the pin slidingly engages the smooth bore section of the pin receiving hole, thereby holding the pin substantially laterally fixed or nontiltable. In this position, the cutting insert is loosely held captive on the insert pocket by the clamping head. When the pin is rotated from this second position to a third position, the pin is moved downward along the axis of the pin receiving hole, which causes the locking shoulder of the upper portion of the pin to abut the upwardly facing wall or locking face of the insert aperture and firmly clamp the insert into the insert receiving pocket.

In another embodiment of the present invention, the threaded portion is located between the clamping head and the increased cross section bearing means. In this embodiment, the increased cross section bearing means has an outer lateral surface which tapers inwardly as it extends outwardly from the pin.

This embodiment allows the pin to tilt in the pin receiving hole to receive a cutting insert when the pin is not threadedly engaged with the threaded section of the hole. When the pin is threadedly engaged with the pin receiving hole, the pin is no longer tiltable and is operable to clamp the cutting insert into the insert pocket in the manner described above in the first embodiment.

Therefore, in accordance with the features described above, it is an object of the present invention to provide a toolholding arrangement which may be relatively cheaply and easily manufactured.

It is also an object of the present invention to provide a toolholding arrangement in which a cutting insert may be replaced without removing the locking pin from the toolholder body.

It is also an object of the present invention to provide an insert clamping arrangement and method in which an insert is clamped both downwardly and laterally in the insert pocket.

BRIEF DESCRIPTION OF THE DRAWINGS

The exact nature of the present invention will become more clearly apparent upon reference to the following detailed specification taken in connection with the accompanying drawings in which:

FIG. 2 is a vertical longitudinal section along line II—II of FIG. 1 showing a negative rake insert being loaded onto the toolholder.

FIG. 3 is a view of the same embodiment shown in FIG. 2 except that the pin has been rotated to a second position in which it is held nontiltable, and it, in turn, holds the insert loosely captive on the insert pocket.

FIG. 4 is a view of the same embodiment shown in FIG. 3 except that the pin has been rotated from the second to a third position in which it is now firmly clamping the insert onto the insert pocket.

FIG. 6 is a longitudinal diametric cross section of the reduced pitch diameter threads shown in FIGS. 2 through 5.

FIGS. 7 and 8 are alternate embodiments of the reduced pitch diameter threads shown in FIG. 6.

DETAILED DESCRIPTION OF THE INVENTION

Figure 1:
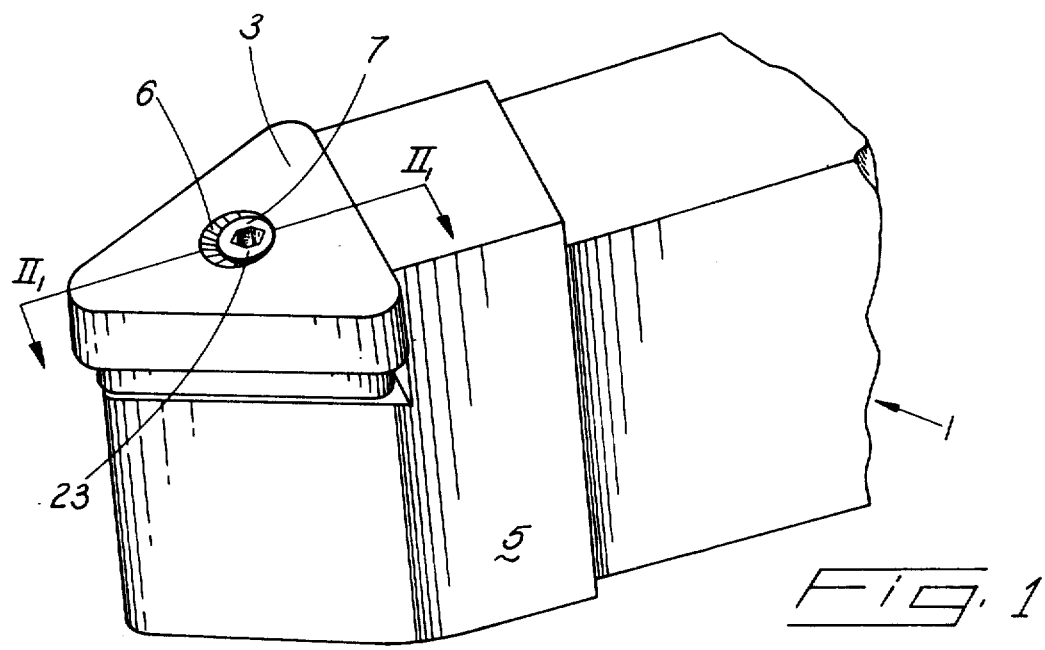
FIG. 1 shows a toolholder, with a cutting insert locked thereon by a lock pin according to the present invention.

Referring to the drawings somewhat more in detail, as can be seen in FIG. 1, the present invention consists of a toolholder 1 for holding a cutting insert 3. The cutting insert may be a negative rake insert, as shown in FIG. 1, a positive rake cutting insert, or any of the other insert styles known in the art. The toolholder 1 comprises a toolholder body 5 and a locking pin 7. The locking pin 7 has a head portion 23 which fits into a tapered aperture 6 in the cutting insert 3 and clamps against a side wall of that tapered aperture so as to hold the cutting insert 3 on an insert seat on the toolholder body 5.

Referring now to FIGS. 2, 3 and 4, the details of the present invention are more clearly shown. These figures consist of sections taken along line II—II of FIG. 1 and show how the present invention operates to clamp the cutting insert 3 onto the toolholder body 5.

In FIG. 2, a toolholder body 5 is shown having an insert receiving pocket 11. The insert receiving pocket 11 has a side wall 13 rising up from a bottom wall 15. Formed downwardly through, and substantially perpendicularly to, the bottom wall 15 is a pin receiving hole 17. Preferably, the pin receiving hole 17 is aligned normally to the bottom wall 15. This preferred design simplifies manufacture of the toolholder body 5 since both the insert receiving seat 11 and pin receiving hole 17 can be machined in one machining set up rather than the two set ups that may be required when the pin receiving hole is not normal to the bottom wall of the insert receiving pocket. This pin receiving hole 17 has a smooth bore section 21 and a threaded section 19.

At least partially engaged in the threaded section 19 of the pin receiving hole 17 is a locking pin 7. The locking pin 7 has an upper portion 23 which has a first and a second diameter with the first diameter being smaller than the second diameter. Formed between the first and second diameter is a downwardly facing or locking shoulder 25 which will be used to abut against a tapered aperture 6 in the insert 3. The second diameter is sized so as to fit within a reduced diameter portion 4 of the insert aperture.

At the other end of the locking pin 7 is a threaded portion 27. This threaded section has reduced pitch diameter threads on it. Located between the upper portion 23 and the threaded portion 27 is an increased diameter section 29. As can be seen in this figure, a flange 33 may be located near the top of the increased diameter section 29 when a shim member 31 is used for mounting the insert 3.

In the position of the pin 7 shown in FIG. 2, it can be seen that the reduced pitch diameter threads 27 are at least partially engaged in the threaded section 19 of the pin receiving hole 17. This allows the locking pin 7 to be tilted outwardly from the side wall 13 of the insert receiving pocket 11 while still being retained in the pin receiving hole 17. In this position, a cutting insert 3 having a tapered aperture 6 with an upwardly facing wall or locking face 9 may be slid over the upper portion of the locking pin 7.

After the cutting insert 3 has been mounted upon the lock pin 7, the locking pin 7 is rotated so that it draws itself further downwardly into the pin receiving hole 17 as shown in FIG. 3. In FIG. 3, it can be seen now that the locking pin 7 has been drawn into the pin receiving hole 17 to such an extent that the increased diameter portion 29 of the pin 7 is in sliding and snug engagement with the smooth bore section 21 of the pin receiving hole 17. The locking pin 7 is thereby held substantially laterally fixed or nontiltable.

When the pin 7 is so engaged, the longitudinal axis, or a center line of the pin, is held parallel to the axis I—I of the cutting insert aperture 6. However, the axis P—P of the locking pin 7 and the axis I—I of the cutting insert 3 are not colinear, the axis P—P of the locking pin 7 being closer to the side wall 13 than the axis I—I of the cutting insert. In this second position, the downwardly facing or locking shoulder 25 of the upper portion of the pin 23 acts to loosely hold captive the cutting insert 3.

As the locking pin 7 is rotated further inwardly into the pin receiving hole 17, the downwardly facing or locking shoulder 25 on the upper portion of the locking pin 7 now comes into contact with the upwardly facing wall or locking face 9 in the tapered aperture 6 of the cutting insert 3.

When this occurs, the cutting insert is driven downwardly against either the shim member 31 as shown in FIG. 4 or, where there is no shim used, against the bottom wall 15 of the insert receiving pocket 11. At the same time that this is occurring, the insert is also being driven laterally against the side wall 13 of the insert receiving pocket 11.

It will be noted in viewing FIGS. 3 and 4 that the locking pin 7 maintains its parallel relationship to the axis of the cutting insert and the axis of the pin receiving hole 17 during the clamping of the insert 3 into the insert receiving pocket 11.

As shown in the figures, the locking pin 7 may have hex shaped openings 8, or equivalents, at both ends of the pin 7 for engagement with a suitable rotation causing means.

Figure 5:
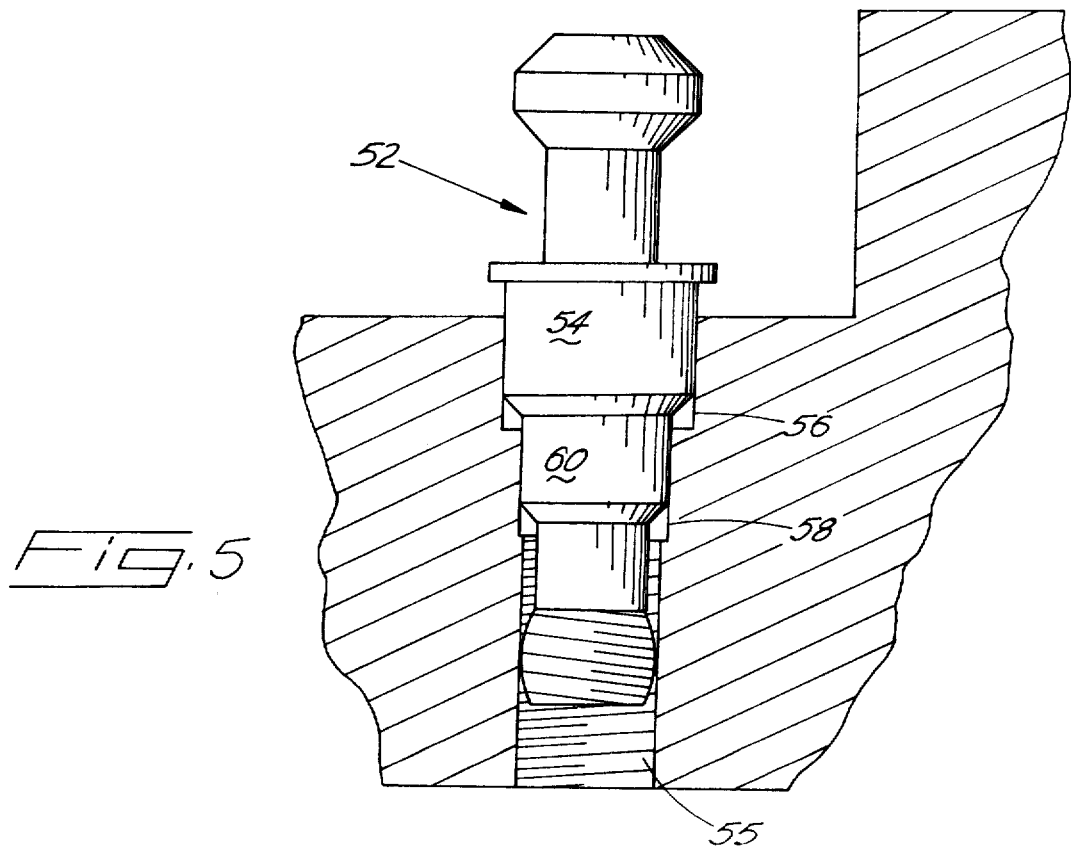
FIG. 5 is a preferred embodiment of the locking pin and toolholder body according to the present invention.

FIG. 5 shows a preferred embodiment of the toolholder body and locking pin. Locking pin 52 is shown having an increased diameter section which is composed of two steps 54 and 60. Step 54 fits slidingly and snugly into a smooth bore 56 in the pin receiving hole 55 and step 60 fits snugly and slidingly into a smooth bore 58 in the pin receiving hole 55. Step 60 has a smaller diameter than step 54 and is located between step 54 and the threaded portion on the end of the locking pin. The purpose of forming the increased diameter section, as shown in FIG. 5, is to improve the load bearing characteristics of the pin when the pin is clamped against the cutting insert. Locking pin 52, when clamped against an insert, will bear the loads produced by the clamping in two areas diametrically opposite to where the pin clamps against the insert; one area on each of steps 54 and 60, rather than the one bearing area produced in the locking pin 7 increased diameter section 29.

FIG. 6 shows a longitudinal diametric cross section of the threaded portion of the locking pin shown in FIGS. 2 through 5. It can be seen that the threaded section is made up of individual thread members having peaks 72. The peaks have been turned down on a lathe such that they form an imaginary envelope that appears to be bi-convex as shown in FIG. 6.

This shaping of the threads allows the locking pin 7 to easily tilt in the threaded section 19 of the pin receiving hole 17 when the locking pin 7 is positioned as shown in FIG. 2, while also allowing each thread to be engaged against the threads in threaded section 19, thereby distributing the vertical clamping load produced on the threads when the insert is clamped as shown in FIG. 4.

Alternatively, instead of having the bi-convex shape shown in FIG. 6, the reduced pitch diameter threads can have the shapes shown in FIGS. 7 and 8.

In FIG. 7, the individual thread members have had their peaks 82 machined on a lathe such that the peaks 82 form a trapezoidal envelope with the larger base on the upward side.

In FIG. 8, the reduced pitch diameter threads have had their ends 92 machined on a lathe such that their ends form a trapezoidal envelope with the larger base facing downward.

Figure 9:
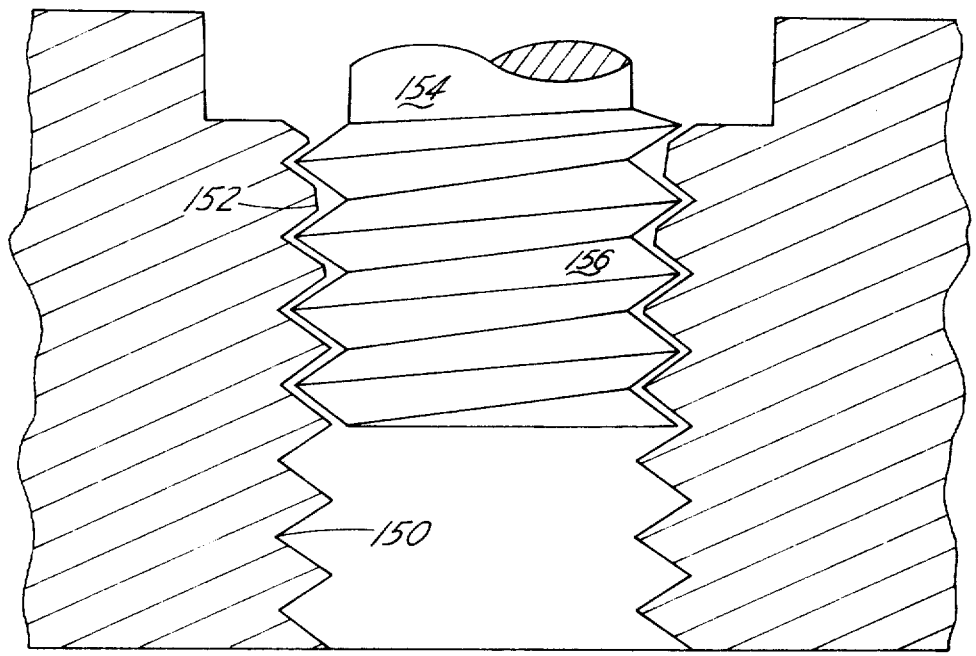
FIG. 9 shows a fragmentary view of an alternate embodiment of a toolholder and locking pin according to the present invention.

Shown in FIG. 9 is another alternative embodiment according to the present invention in which the threaded section 150 of a pin receiving hole has an increased pitch diameter threaded section 152. This embodiment would allow the use of a locking pin 154 having a standard uniformly threaded portion 156 in the present invention. When threaded portion 156 is engaged with the increased pitch diameter threaded section 152, the pin 154 would be tiltable.

Figure 10:
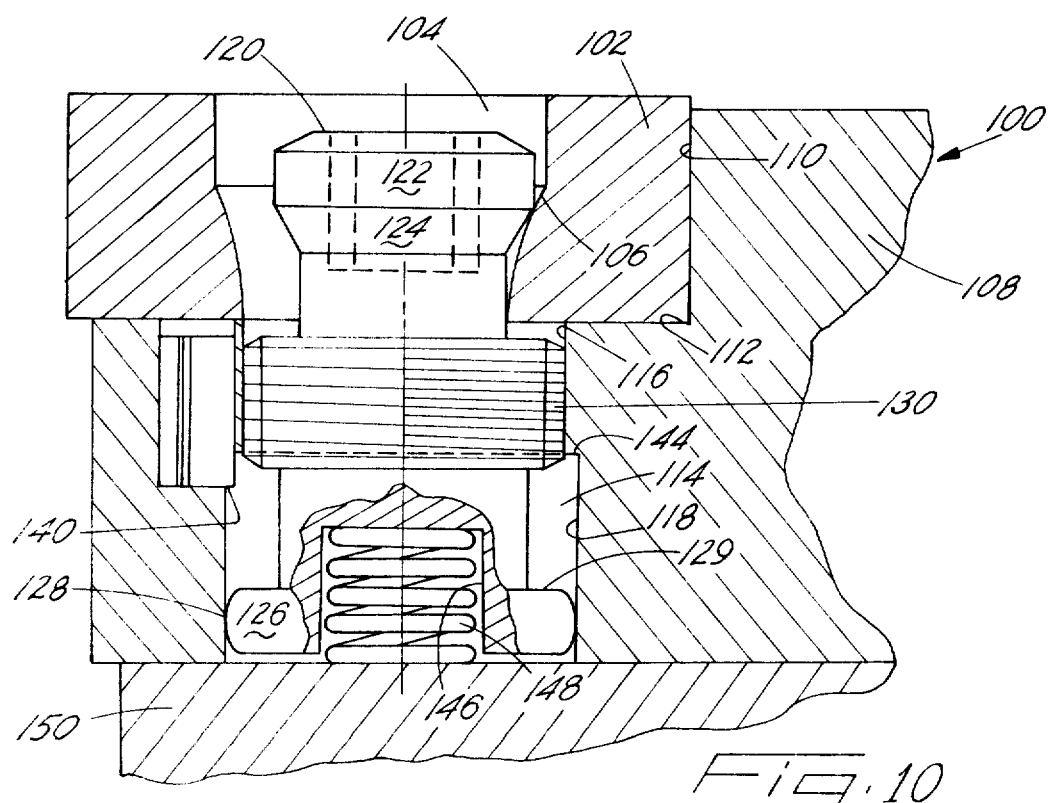
FIG. 10 shows another alternate embodiment of a toolholder and locking pin according to the present invention.

FIG. 10 shows an alternative embodiment to the toolholders and locking pins shown in the previous figures. In FIG. 10, there is shown a toolholder 100 having a toolholder body 108 with an insert receiving pocket having a side wall 110 rising from a bottom wall 112. The bottom wall 112 has an insert receiving hole 114 formed downwardly and substantially perpendicular to it. This insert receiving hole 114 has a threaded section 116 and a smooth bore section 118.

Located in this pin receiving hole 114 is a locking pin 120. The locking pin has an upper portion 122 with a downwardly facing or locking shoulder 124. At the lower end of the locking pin 120 is an increased diameter section 126. When viewed in profile, increased diameter section 126 has an outer peripheral surface 128 that tapers inwardly as it extends outwardly. Located between the upper portion 122 and the increased diameter section 126 is a threaded portion 130.

As shown in this figure, the locking pin 120 clamps downwardly against a tapered upwardly facing wall or locking face 106 in an insert aperture 104 so as to clamp the insert 102 against the side wall 110 and the bottom wall 112 of the insert receiving pocket. This locking pin 120 can be formed in a shorter length than the locking pin shown in FIGS. 2 through 8, and is, therefore, ideally suited for toolholder bodies 108 which are required to have a shallow depth. For example, toolholder bodies 108 having a short depth may be required on the periphery of a boring head 150.

The toolholder 100 operates as follows: When the threaded portion 130 of the locking pin 120 is out of engagement with the threaded section 116 of the pin receiving hole 114, the pin 120 is able to tilt outwardly since the increased diameter section 126 has a tapered peripheral surface 128. At this point, the upwardly facing shoulder 129 of the increased diameter section 126 may abut a downwardly facing shoulder 144 in the pin receiving hole 114. It may also abut an abutment surface or pin 140 which protrudes into the smooth bore section 118 of the pin receiving hole 114. Abutment pin 140 is optional and, when used in conjunction with spring 148 in recess 146, serves to automatically tilt the pin 120 outwardly away from wall 110.

When the locking pin 120 is tilted outwardly, the cutting insert 102 may be slid over the upper portion 122 of the locking pin 120. The locking pin is then rotated so as to threadedly engage the threaded section 116 of the pin receiving hole 114 and thereby becomes aligned parallel to the axis of the pin receiving hole 114 and is no longer tiltable.

In this position, it holds the insert 102 captive in the insert receiving pocket. Further rotation of the locking pin 120 downward into the pin receiving hole 114 will bring the downwardly facing or locking shoulder 124 into abutment with the upwardly facing wall or locking face 106 on the cutting insert 102 and thereby drive the cutting insert into abutment with the side wall 110 and bottom wall 112 of the insert receiving pocket thereby firmly securing it to the toolholder body 108.

Figure 11:
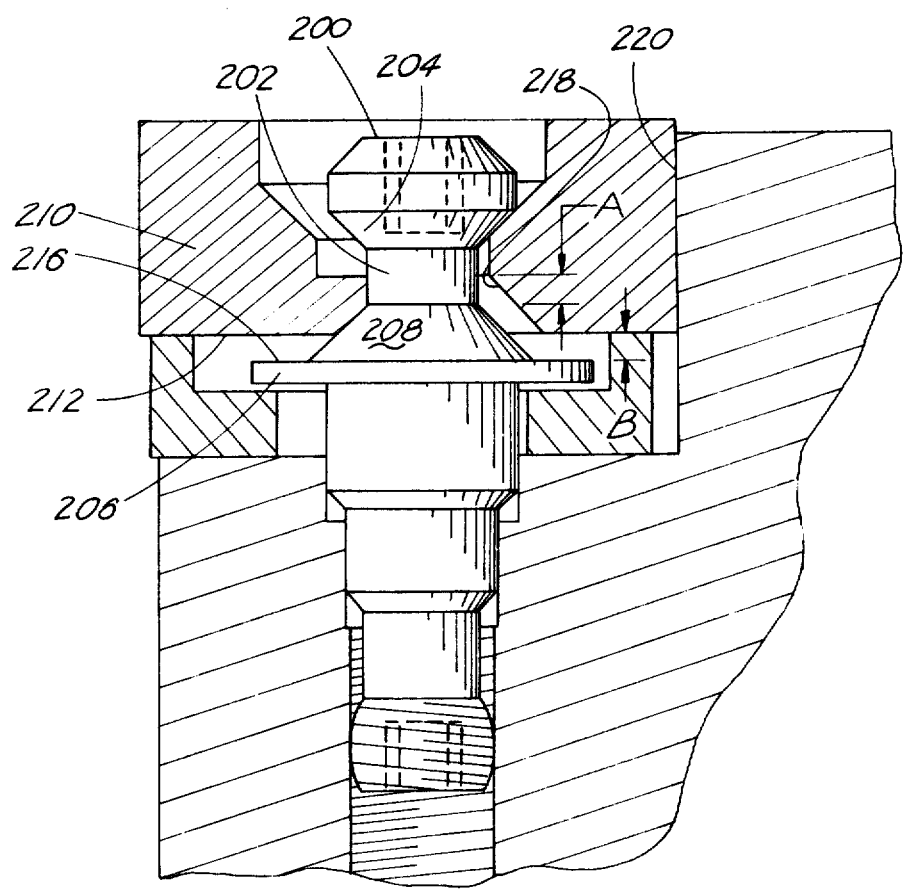
FIG. 11 shows another alternate embodiment of a locking pin according to the present invention.

FIG. 11 shows another embodiment of the present invention. In this embodiment, pin 200 is equivalent to the pin 52 shown in FIG. 5 with the exception that the neck portion 202 between the downwardly facing clamping shoulder 204 and the shim retaining flange 206 has been strengthened by a frustoconical section 208 tapering upwardly. It should be noted that pin 200 is preferably used with an insert 210 whose central bore diameter gradually increases as it approaches the bottom face 212 of the insert 210.

When used with inserts of this type, the apex angle of the conical envelope in which the insert tapered surface 218 lies is preferably equal to or greater than the apex angle for the frustoconical surface 208 on the pin 200. In this embodiment, it is also preferred that, when the insert 210 is in the clamped position, the distance A, between the upper end of the tapered section 218 in the insert bore and the upper end of the frustoconical section 208, be greater than the distance B, between the upper face 216 of the flange 206 and the bottom face 212 of the insert. Dimensioning of the components in this manner provides assurance that, upon unclamping of the insert, the first part of the pin to contact the insert will not be the frustoconical surface, thus avoiding the possibility of binding the insert between the frustoconical surface 208 and the walls 220 of the insert seat during unclamping.

Modifications may be made within the scope of the appended claims.

What is claimed is:

1. A toolholder for use in holding a cutting insert having a tapered aperture wherein a wall of said aperture forms a locking face, and wherein said toolholder comprises: a toolholder body and a cooperating locking pin means;

said toolholder body comprising an insert receiving pocket having a planar bottom wall and a side wall substantially normal to said bottom wall; and a pin receiving hole formed through, and substantially normal to, said bottom wall, said pin receiving hole having a threaded section and a cylindrical smooth bore section;

said locking pin means comprising a diametrical elongate body; a clamping head having a locking shoulder; an increased diameter section having a circumferential surface which is arcuate in longitudinal cross section; and a threaded portion located between said locking shoulder and said increased diameter section;

said locking pin means rotatably mounted in said pin receiving hole with said clamping head extending into said insert receiving pocket, with said increased diameter section having a maximum diameter sized for sliding engagement with said smooth bore section of said pin receiving hole and with the respective threaded portion and section of said locking pin means and said pin receiving hole threadedly engaged so that rotation of said locking pin means advances or retracts said locking pin means in said pin receiving hole; said locking pin means when rotated to a first position is freely tiltable so as to allow said clamping head to be inserted into said insert aperture; said locking pin means, when rotated to a second position, is held substantially laterally fixed by the sliding engagement of said increased diameter section with said smooth bore section in combination with the threaded engagement of said locking pin means threaded portion with said pin receiving hole threaded section, and wherein said locking pin means, when in said second position, loosely holds said insert captive in the toolholder pocket; and said locking pin means, when rotated from said second to a third position, causes the locking shoulder of said clamping head to abut said locking face of said insert aperture and clamp said insert against said bottom and side wall of said insert receiving pocket.

2. A toolholder according to claim 1 further comprising an abutment means extending into the smooth bore section of the pin receiving hole and generally toward said side wall of said pin receiving pocket; said abutment means having a shoulder facing said increased diameter section of said locking pin means for abutment with said increased diameter section of said locking pin means so as to assist in tilting said pin in a desired direction when it is in the first position.

3. A toolholder according to claim 1 or 2 further comprising means for urging said locking pin outwardly from said pin receiving hole.

4. A toolholder according to claim 3 wherein said locking pin means further comprises an opening in said increased diameter section; said opening facing away from said clamping head; and said means for urging said locking pin means outwardly located in said opening.

5. A locking pin for securing a cutting insert onto a toolholder body, wherein said locking pin comprises: a diametrical body having means for clamping against an insert near one end of said diametrical body, an integral increased diameter section near the opposite end to said one end of said diametrical body, a threaded portion intermediate said means for clamping and said increased diameter section, and means for rotating said pin, said means for rotating located at said one end of said diametrical body.

6. An improved locking pin of the type for clamping a cutting insert having a pin receiving aperture onto an insert seat of a toolholder body, said insert seat having a pin receiving hole having a threaded section and an increased diameter smooth bore section, wherein said improved locking pin comprises: a generally elongate diametrical body having an insert clamping means near one end; an integral means for snugly and slidingly engaging said increased diameter smooth bore near the other end of said body; a threaded portion intermediate said clamping means and said means for slidingly and snugly engaging, said means for slidingly and snugly engaging having a laterally facing surface which is arcuate in longitudinal cross section.

7. A locking pin according to claim 6 further comprising a spring means exerting a force on, and parallel to, the longitudinal axis of said elongate body.

* * * * *